(12) United States Patent
Boodannavar et al.

(10) Patent No.: US 10,791,511 B2
(45) Date of Patent: Sep. 29, 2020

(54) OPERATING LOW-POWER ASSOCIATED SLEEP

(71) Applicant: Apple Inc., Cupertino, CA (US)

(72) Inventors: Veerendra Boodannavar, Cupertino, CA (US); Ronald K. Huang, San Jose, CA (US); Rajneesh Kumar, San Jose, CA (US); Kapil Chhabra, Cupertino, CA (US); Faraz Faheem, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,314

(22) Filed: May 31, 2019

(65) Prior Publication Data

US 2020/0107261 A1 Apr. 2, 2020

Related U.S. Application Data

(60) Provisional application No. 62/738,451, filed on Sep. 28, 2018.

(51) Int. Cl.
*H04W 52/02* (2009.01)
*H04W 88/08* (2009.01)
*H04W 52/28* (2009.01)
*H04W 84/12* (2009.01)

(52) U.S. Cl.
CPC ..... *H04W 52/0206* (2013.01); *H04W 52/281* (2013.01); *H04W 88/08* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2008/0298289 | A1* | 12/2008 | Jeyaseelan | H04W 52/0235 370/311 |
| 2014/0086124 | A1* | 3/2014 | Knowles | G08B 25/10 370/311 |
| 2016/0112947 | A1* | 4/2016 | Sahoo | H04W 4/80 370/311 |

* cited by examiner

*Primary Examiner* — Anh Ngoc M Nguyen
(74) *Attorney, Agent, or Firm* — Sterne, Kessler, Goldstein & Fox P.L.L.C.

(57) ABSTRACT

Some embodiments enable low power mode for wireless local area network (WLAN) subsystem of an electronic device to improve power usage at the electronic device and increase response time of the WLAN subsystem to prioritized application(s). For example, a method includes enabling a sleep mode of the WLAN subsystem of the electronic device. The electronic device maintains a connection with an access point of a wireless network during the sleep mode. The method further includes receiving a request from an application to communicate with the wireless network. The application is included in a list of prioritized applications. In response to determining that a metric associated with the sleep mode does not exceed a power budget, the sleep mode of the WLAN subsystem is suspended and the communication between the application and the access point of the wireless network is enabled (after the suspension of the sleep mode).

20 Claims, 6 Drawing Sheets

OPERATING LOW-POWER ASSOCIATED SLEEP

CROSS-REFERENCE TO RELATED APPLICATIONS

The present application claims the benefit of U.S. Provisional Patent Application No. 62/738,451, filed on Sep. 28, 2018, which is hereby incorporated by reference in its entirety.

BACKGROUND

Field

The described embodiments generally relate to controlling power usage for an electronic device.

Related Art

An electronic device can communicate with other devices using different types of communication networks. For example, the electronic device can use cellular networks (e.g., 3G, 4G, 5G networks), wireless local area networks (WLANs) (also called, Wi-Fi networks), Bluetooth™ networks, or other type networks for communicating with other devices. The electronic device can include one or more circuits for its connection to these networks. Establishing and maintaining connection with different networks may use different amounts of power depending on the type of network. Also, latency, throughput, and bandwidth of the communication through different networks can depend on the type of the network.

SUMMARY

Embodiments include an electronic device, method, and computer program product for enabling low power mode for a wireless local area network (WLAN) subsystem of an electronic device to improve power usage of the electronic device and also to increase the response of the WLAN subsystem to prioritized application(s).

Some embodiments relate to an electronic device. The electronic device includes a memory that stores program instructions, a wireless local area network (WLAN) subsystem configured to communicate over a wireless network, and a processor. The processor, upon executing the program instructions, enables a sleep mode of the WLAN subsystem. The electronic device maintains a connection with an access point of the wireless network during the sleep mode. During the sleep mode of the WLAN subsystem, the processor further receives a request from an application to communicate with the wireless network. The application is in a list of prioritized applications. The processor is further configured to determine that a metric associated with the sleep mode of the WLAN subsystem is less than or equal to a power budget. In response to this determination, the processor is further configured to suspend the sleep mode of the WLAN subsystem and enable the communication between the application and the access point of the wireless network using the WLAN subsystem.

Some embodiments relate to a method. The method includes enabling a sleep mode of a wireless local area network (WLAN) subsystem of an electronic device. The electronic device maintains a connection with an access point of a wireless network during the sleep mode. The method further includes receiving from an application, while the WLAN subsystem is in the sleep mode, a request to communicate with the wireless network. The application is included in a list of prioritized applications. In response to determining that a metric associated with the sleep mode of the WLAN subsystem does not exceed a predetermined power budget for a time interval, the sleep mode of the WLAN subsystem is suspended and the communication between the application and the access point of the wireless network using the WLAN subsystem is enabled (after the suspension of the sleep mode). The predetermined power budget can include a total time to perform operations to maintain the connection with the access point during a time interval.

Some embodiments relate to a non-transitory computer-readable medium storing instructions. When the instructions are executed by a processor of an electronic device, the instructions cause the processor to enable a low-power associate sleep (LPAS) mode for the electronic device. During the LPAS mode, a wireless local area network (WLAN) subsystem of the electronic device is in a sleep mode while the electronic device maintains a connection with an access point of a wireless network. During the sleep mode of the WLAN subsystem, the processor further receives a request from an application to communicate with the wireless network. The application is included in a list of prioritized applications. In response to determining that a metric associated with the sleep mode has a value less than or equal to a power budget, the processor suspends the sleep mode of the WLAN subsystem and enables, subsequent to suspending the sleep mode, the communication between the application and the access point of the wireless network using the WLAN subsystem.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
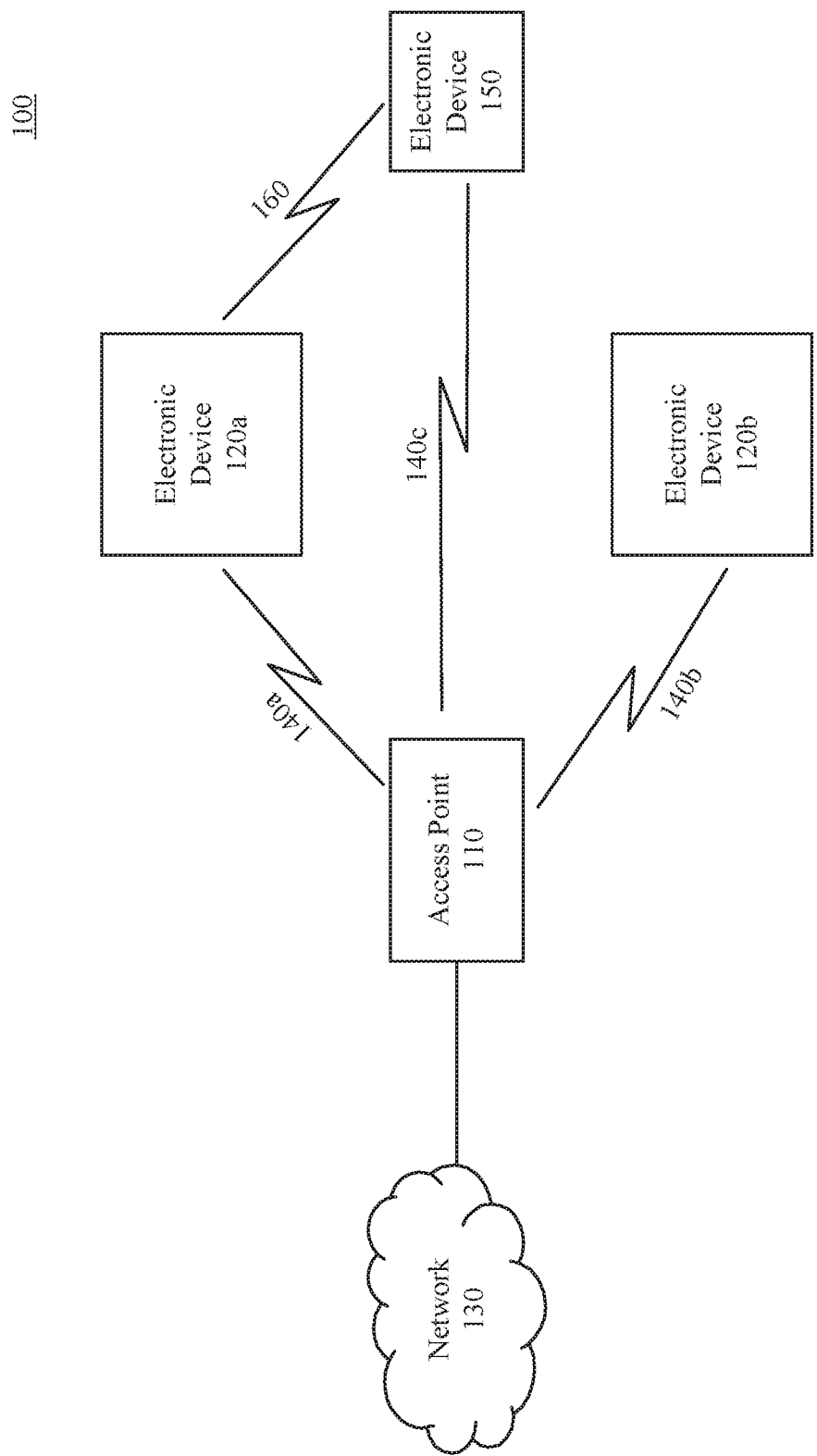
FIG. 1 illustrates an example system implementing LPAS mode, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Embodiments enable low power mode operation for wireless local area network (WLAN) interface(s) of an electronic device to improve power usage at the electronic device and also to increase the response of the WLAN interface(s) to prioritized application(s), e.g., to improve user experience. The electronic device may implement a low-power associated sleep (LPAS) mode. The LPAS mode is enabled when no applications are actively using a WLAN subsystem (e.g., WLAN interface). Therefore, in the LPAS mode the WLAN subsystem can operate in a low power (or lower power) mode. During the LPAS mode, the electronic device maintains connectivity with a communication hub (e.g., an access point (AP)) of the WLAN without using the WLAN subsystem for any data exchange. In the LPAS mode, the electronic device can reduce power consumption but also can be readily available when a client (e.g., an application) is activated to use the WLAN subsystem. In other words, since the WLAN subsystem can operate in the low power mode during the LPAS mode, the electronic device can consume less power compared to when the WLAN subsystem operates as the primary networking interface of the electronic device. However, since the WLAN subsystem maintains connectivity with the communication hub, the WLAN subsystem is readily available as soon as an application is activated and the application desires to communicate with the communication hub using the WLAN subsystem.

FIG. 1 illustrates an example system 100 implementing LPAS mode, according to some embodiments of the disclosure. Example system 100 is provided for the purpose of illustration only and is not limiting of the disclosed embodiments. System 100 may include, but is not limited to, access point 110, electronic devices 120, network 130, and electronic device 150. Electronic devices 120a and 120b may include, but are not limited to, Wireless Local Area Network (WLAN) electronic devices, such as wireless communication devices, smart phones, laptops, desktops, tablets, personal assistants, monitors, televisions, wearables (e.g., watches), and the like. Access point (AP) 110 may include, but is not limited to, a WLAN electronic device such as a wireless router, a wearable device (e.g., a smart watch), a wireless communication device (e.g., a smart phone), or a combination thereof. Network 130 may be the Internet and/or a WLAN. Electronic device 150 may include, but is not limited to, a wearable device (e.g., a smart watch).

Electronic devices 120 can communicate with AP 110 using, for example, wireless communications 140. Electronic device 150 can communicate with AP 110 using, for example, wireless communication 140c. Additionally, electronic device 150 can communicate with electronic device 120 using, for example, wireless communication 160.

According to some examples, electronic devices 120 and 150 are configured to enable LPAS mode and operate in a low power (or lower power) mode. Some examples of this disclosure are discussed with respect to the enablement and operation of LPAS mode at electronic device 150. But the embodiments of this disclosure are not limited to these examples and other electronic devices can also enable and operate in an LPAS mode. According to some embodiments, electronic device 120a is a companion electronic device for electronic device 150. As a non-limiting example, electronic device 150 can be a smart watch paired with companion electronic device 120a (e.g., a smart phone).

According to some embodiments, wireless communication 160 between electronic device 150 and companion electronic device 120a can be based on a Bluetooth™ protocol. Wireless communication 140a between companion electronic device 120a and AP 110 can be based on a WLAN protocol. For example, wireless communication 140a can be established after companion electronic device 120a enters the wireless range of AP 110. AP 110 transmits beacon frame(s) to announce its presence. The beacon frame(s) can include information regarding the WLAN associated with AP 110. For example, the information in the beacon frame(s) can include a time synchronization function (TSF) counter that is a timestamp used to synchronize a clock of companion electronic device 120a (and/or other electronic devices) with a clock of AP 110. The information in the beacon frame(s) can also include a service set identifier (SSID) that is used as an identifier for AP 110. The information in the beacon frame(s) can further include a beacon interval indicating a time interval between subsequent beacon transmissions.

After receiving the beacon frame(s) from AP 110, companion electronic device 120a can associate with AP 110 and establish wireless communication 140a with AP 110 through, for example, the WLAN of AP 110. When companion electronic device 120a establishes wireless communication 140a, electronic device 150 can also be triggered to establish wireless communication 140c with AP 110. According to some examples, wireless communication 140c is based on a WLAN protocol.

In one example, after establishing wireless communication 140a, companion electronic device 120a can send an indication to electronic device 150 through wireless communication 160 (e.g., based on Bluetooth™ protocol) that companion electronic device 120a has detected and has associated with AP 110. Additionally, companion electronic device 120a can send information regarding AP 110 and/or the wireless network associated with AP 110 to electronic device 150. The information associated with AP 110 that is sent to electronic device 150 can include, but is not limited to any/all of the SSID of AP 110, the TSF counter, the beacon interval, and the like.

In some examples, before sending the indication and the information to electronic device 150, companion electronic device 120a can determine whether electronic device 150 can connect to AP 110. If companion electronic device 120a determines that electronic device 150 cannot connect to AP 110, companion electronic device 120a can check for other networks for electronic device 150 to connect. If found, companion electronic device 120a can transmit information associated with that network to electronic device 150. In a non-limiting example, if companion electronic device 120a connects to AP 110 on a 5 GHz WLAN but electronic device 150 cannot connect on a 5 GHz WLAN, companion electronic device 120a can search for a corresponding 2.4 GHz WLAN for electronic device 150 to connect.

After receiving the information from companion electronic device 120a, electronic device 150 can establish a wireless connection with AP 110 (e.g., wireless communication 140c) using the received information. According to some examples, if companion electronic device 120a leaves the WLAN of AP 110 (e.g., wireless communication 140a is disabled/disconnected) but electronic device 150 is still in the range of the WLAN of AP 110, electronic device 150 can maintain its connection with AP 110 (e.g., maintain wireless communication 140c.)

According to some embodiments, electronic device 150 can establish the wireless connection with AP 110 without receiving the indication and/or the information from companion device 120a. For example, electronic device 150 can initiate a network scan to determine whether any network in a list of networks maintained by electronic device 150 is available. If no network is found, electronic device 150 can perform one or more network scans at a later time. In some examples, electronic device 150 can perform the network scan in response to an application being activated. For example, when the application is activated, electronic device 150 can determine, based on, for example, connection requirement(s) of the application, whether a WLAN connection is preferred. If electronic device 150 determines that the WLAN connection is preferred, electronic device 150 can perform the network scan. If electronic device 150 finds an available network in the list of networks maintained by electronic device 150, electronic device 150 may associate with the available network.

In some examples, establishing the wireless connection between the electronic device 150 and AP 110 can be an on-demand process. In other words, electronic device 150 does not establish the wireless connection with AP 110 until an application and/or a user of electronic device 150 requests the connection. Additionally or alternatively, electronic device 150 does not establish the wireless connection with AP 110 until companion electronic device 120a is not in a communication range of electronic device 150. In other words, electronic device 150 establishes a wireless connection 140c with AP 110 in response to a determination that companion electronic device 120a is not in communication range of electronic device 150.

When electronic device 150 associates with AP 110, (e.g., establishes the wireless connection with AP 110), electronic device 150 enters the low-power associated sleep (LPAS) mode, according to some embodiments. The LPAS mode is enabled when no applications of electronic device 150 are actively using the wireless connection between electronic device 150 and AP 110 (e.g., no application is actively using a WLAN subsystem (e.g., WLAN interface) of electronic device 150). Therefore, in the LPAS mode the WLAN subsystem of electronic device 150 can operate in a low power (or lower power) mode. During the LPAS mode, electronic device 150 maintains connectivity with AP 110 without using the WLAN subsystem of electronic device 150 for any data exchange. In the LPAS mode, electronic device 150 can reduce power consumption but also can be readily available when an application of electronic device 150 is activated to use the WLAN subsystem. In other words, since the WLAN subsystem of electronic device 150 can operate in the low power mode during the LPAS mode, electronic device 150 can consume less power compared to when the WLAN subsystem of electronic device 150 operates as the primary networking subsystem of electronic device 150. However, since the WLAN subsystem of electronic device 150 maintains the connectivity with AP 110, the WLAN subsystem is readily available as soon as an application is activated and the application desires to communicate with AP 110 using the WLAN subsystem.

According to some embodiments, during the LPAS mode, electronic device 150 can maintain the connectivity (e.g., a link—wireless communication 140c) with AP 110 by periodically sending address resolution protocol (ARP) packets (e.g., every 90 seconds.) In some instances, one or more ARP packets may be gratuitous. Additionally or alternatively, electronic device 150 can periodically send "Keep-Alive" messages, during the LPAS mode, to AP 110 such that the connection does not time out. In some examples, the electronic device can periodically listen for beacons from AP 110 with reduced frequency (e.g., every 2 seconds) during the LPAS mode, compared with normal operation (e.g., non-LPAS operation). During normal operation, electronic device 150 can listen for beacons from AP 110, for example, every 100 msec. In some examples, electronic device 150 can also drop one or more of any Unicast, Multicast, or Broadcast message transmitted by the AP during the LPAS mode.

During the LPAS mode, electronic device 150 can be configured to perform other operations in order to maintain the connectivity with AP 110 but also consume less power. As one example, electronic device 150 can be configured to enable Beacon Early Termination, that can allow electronic device 150 to reduce the time of beacon processing. By enabling Beacon Early Termination during the LPAS mode, the reception of beacons from AP 110 can be terminated in early stages if there are no buffered frames advertised by AP 110 in the beacons.

According to some embodiments, during the LPAS mode and during the operation(s) to associate with AP 110 and/or operation(s) to maintain the connectivity with AP 110, electronic device 150 may operate its WLAN subsystem or one or more transceivers of the WLAN subsystem at normal (or substantially normal) operating power. For example, the WLAN subsystem of electronic device 150 may operate at normal operating power to transmit ARP packets (e.g., gratuitous ARP packets), transmit "Keep-Alive" messages, listen for (or receive) beacon(s), update transceiver clocks and/or frequency, or the like to associate with AP 110 and/or to maintain the connectivity with AP 110. Alternatively, the one or more WLAN transceivers can be activated (e.g., turned "on") to perform the connectivity maintenance, but operate at a reduced power level compared to normal operating power, (e.g. outside LPAS mode).

In some examples, during the LPAS mode, no active sockets are created on the WLAN subsystem of electronic device 150. In another example, during the LPAS mode, electronic device 150 can enable Link Debounce that enables a debounce timer on the WLAN subsystem of electronic device 150. The debounce timer can determine the amount of time that the WLAN subsystem waits to notify a supervisor of the link going down. According to some examples, during the LPAS mode, electronic device 150 can configure power save timers within the WLAN subsystem. Additionally or alternatively, electronic device 150 can block some events that can cause the host to wake.

According to some embodiments, electronic device 150 includes and/or has access (e.g., through companion electronic device 120a) to a list of prioritized applications. The list of prioritized applications can include one or more applications that have a requirement(s) for low latency, high throughput, high bandwidth, fast response time, and/or the like. According to some examples, the prioritized applications can include user applications such as, but not limited to, Siri™, radio streaming, video streaming, remote control, and the like. Additionally or alternatively, the prioritized applications can include indication(s) from companion electronic device 120a—e.g., an indication from companion electronic device 120a to electronic device 150 that companion electronic device 120a has detected and has associated to AP 110.

In some embodiments, the applications on the list of prioritized applications are the only applications that are aware of the LPAS mode capability on electronic device 150. In other words, applications on electronic device 150, which are not on the list of prioritized applications, are not aware of the LPAS mode capability of the electronic device. When the WLAN subsystem of electronic device 150 is in the LPAS mode, the applications that are not on the list of prioritized applications are not aware that the WLAN subsystem has a connection with the AP. Therefore, the applications that are not on the list of prioritized applications do not request for connection to AP 110 through the WLAN subsystem, because to those applications no WLAN connection is available. In contrast, the applications on the list of prioritized applications can be aware, that although the WLAN subsystem of electronic device 150 is operating in a low power mode, the WLAN subsystem has a connection with AP 110. Therefore, the applications on the list of prioritized applications can request to use the connection with AP 110 as soon as these applications are activated.

According to some embodiments, although the WLAN subsystem of electronic device 150 operates at low power during the LPAS mode, the WLAN subsystem still consumes some power during the LPAS mode. As discussed above, the WLAN subsystem and/or electronic device 150 performs operation(s) during the LPAS mode to maintain the connection with AP 110. The operation(s) performed by the WLAN subsystem of electronic device 150 consumes power, although less than the amount of power consumed when the WLAN subsystem is a primary interface of electronic device 150 and is not in LPAS mode.

According to some embodiments, a power budget (e.g., a predetermined power budget) is defined for electronic device 150 for the LPAS mode. The power budget specifies how much time and/or power the WLAN subsystem of electronic device 150 can consume for associating with AP 110 and/or for the operation(s) performed to maintain the connection during the LPAS mode during a predetermined time period. In some embodiments, the power budget (e.g., the predetermined power budget) can be defined as the amount of time the WLAN subsystem of electronic device 150 can spend for associating with AP 110 and/or for the operation(s) performed to maintain the connection during the LPAS mode during the predetermined time period. Additionally or alternatively, the power budget can be defined as the amount of power the WLAN subsystem of electronic device 150 can spend for associating with AP 110 and/or for the operation(s) performed to maintain the connection during the LPAS mode during a predetermined time period.

The power budget is renewed after each expiration of the predetermine time period. In some examples, the predetermined time period can include, but is not limited to, 18 hours, 24 hours, or the like. Also, the predetermined time period can start at a first preset time instant (e.g., 12 am) and end at a second preset time instant (e.g., 11:59 pm). Alternatively, the predetermine time period can start when electronic device 150 associates with AP 110. In a non-limiting example, the power budget can be 600 seconds in 24 hours. But the embodiments of this disclosure are not limited to these examples and other budget values, other predetermined time periods, and/or other first/second preset time instants can be used.

According to some embodiments, electronic device 150 is configured to track the time and/or power consumed by, for example, the WLAN subsystem during the LPAS mode during the predetermined time period. For example, electronic device 150 determines and tracks a metric as the consumed time and/or power by the WLAN subsystem of electronic device 150 for associating with AP 110 and/or for the operation(s) performed to maintain the connection during LPAS mode, and electronic device 150 compares the determined metric with the power budget to determine whether the WLAN subsystem has consumed its power budget before the predetermined time period is expired.

According to some embodiments, if the determined metric is less than or equal to the power budget, the WLAN subsystem can maintain the LPAS mode. Alternatively, if the determined metric is greater than the power budget, then the LPAS mode is disabled, according to some embodiments. Additionally, the connection to AP 110 can be severed and/or the WLAN subsystem of electronic device 150 can be disabled.

Figure 2:
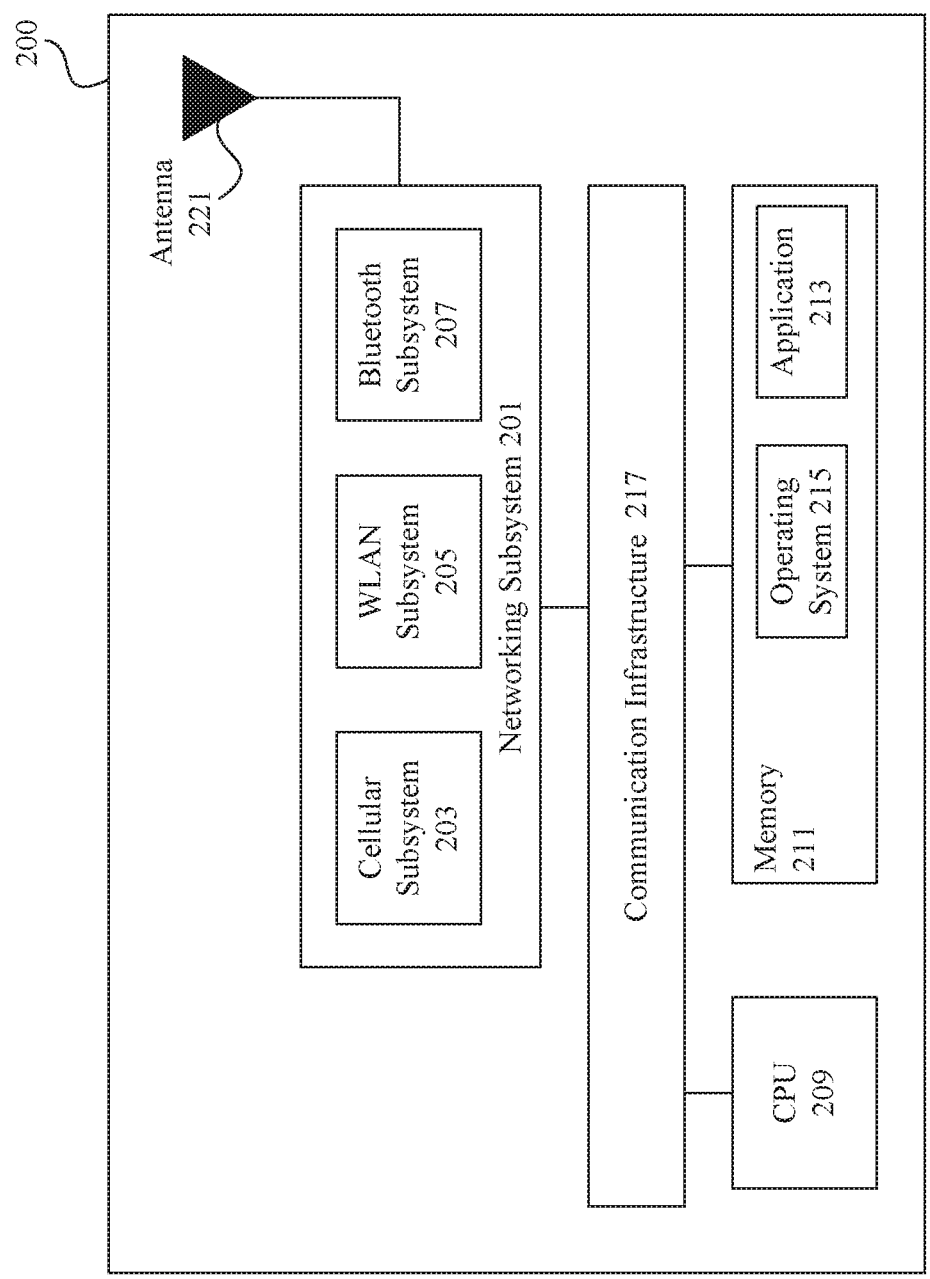
FIG. 2 illustrates a block diagram of an example wireless system supporting the LPAS mode, according to some embodiments of the disclosure.

FIG. 2 illustrates a block diagram of an example wireless system 200 supporting LPAS mode, according to some embodiments of the disclosure. System 200 may be any of the electronic devices (e.g., 110, 120, 150) of system 100.

System 200 includes a networking subsystem 201, a central processing unit (CPU) 209, a memory 211, an application 213, operating system 215, a communication infrastructure 217, and an antenna 221. Illustrated systems are provided as exemplary parts of wireless system 200, and system 200 can include other circuit(s) and subsystem(s). Also, although the systems of wireless system 200 are illustrated as separate components, the embodiments of this disclosure can include any combination of these, less, or more components.

Memory 211 may include random access memory (RAM) and/or cache, and may include control logic (e.g., computer software) and/or data. According to some examples, operating system 215 can be stored in memory 211. Operating system 215 can manage transfer of data from memory 211 and/or one or more applications 213 to networking subsystem 201. In some examples, operating system 215 maintains one or more network protocol stacks (e.g., Internet protocol stack, cellular protocol stack, and the like) that can include a number of logical layers. At corresponding layers of the protocol stack, operating system 215 includes control mechanism and data structures to perform the functions associated with that layer.

According to some examples, application 213 can be stored in memory 211. Application 211 can include applications (e.g., user applications) used by wireless system 200 and/or a user of wireless system 200. The applications in application 211 can include the prioritized applications (e.g., Siri™, radio streaming, video streaming, remote control, and the like) and/or other user applications. In some examples, memory 211 can store the list of prioritized applications for LPAS mode operation of wireless system 200. Memory 211 can also store the power budget associated with the LPAS mode and can store and/or track the usage of power budget.

In addition to or in alternate to the operating system, system 200 can include communication infrastructure 217. Communication infrastructure 217 provides communication between, for example, networking subsystem 201, CPU 209, and memory 211. Communication infrastructure 215 may be a bus. Antenna 221 may include one or more antennas that may be the same or different types.

CPU 209 together with instructions stored in memory 211 performs operations enabling LPAS mode for wireless system 200. Networking subsystem 201 can be part of or include a communication interface of wireless system 200 to communicate with other devices that may be wired and/or wireless. Wireless system 200 can include a transceiver (not shown) to transmit and receive communications signals using networking subsystem 201, according to some embodiments. Additionally or alternatively, networking subsystem 201 can include or be part of the transceiver (not shown) of wireless system 200.

Networking subsystem 201 can include processors, controllers, radios, sockets, plugs, and like circuits/devices used for connecting to and communication on networks. According to some examples, networking subsystem 201 includes one or more circuits to connect to and communicate on wired and/or wireless networks. Wireless subsystem 201 can include a cellular subsystem 203, a WLAN subsystem 205, and a Bluetooth™ subsystem 207, each including its own radio transceiver and protocol(s) as will be understood by those skilled arts based on the discussion provided herein. It is noted that although these three subsystems are illustrated, networking subsystem 201 can include more or less systems for communicating with other devices.

Cellular subsystem 203 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem 207 can include one or more circuits (including an Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem 205 can include one or more circuits (including a WLAN transceiver) to enable connection(s) and communication over WLAN networks such as, but not limited to networks based on standards described in IEEE 802.11.

According to some embodiments, system 200 is configured to operate at low-power associated sleep (LPAS) mode. The LPAS mode is used when no application at, for example, application 213 is actively using WLAN subsystem 205 (e.g., a WLAN interface of WLAN subsystem 205). In this case, WLAN subsystem 205 operates in low power mode—for example, WLAN subsystem 205 is configured as a non-primary networking system. During the LPAS mode, WLAN subsystem 205 maintains connectivity with, for example, AP 110 of FIG. 1 without any data exchange. In the LPAS mode, the power consumption of WLAN subsystem 205 is reduced, but WLAN subsystem 205 is readily available when an application (e.g., an application from application 213) is activated to use WLAN subsystem 205.

During LPAS mode, an application from the list of prioritized applications may request to communicate with, for example, AP 110 of FIG. 1. For example, the application is activated to send and/or receive data. Due to latency, bandwidth, throughput or other requirements, the application requests the communication using WLAN subsystem 205. After CPU 209 and/or WLAN subsystem 205 receives the request from the application, CPU 209 and/or WLAN subsystem 205 is configured to suspend the LPAS mode, configure WLAN subsystem 205 as the primary networking subsystem, and enable the application to communicate with AP 110 using WLAN subsystem 205.

According to some embodiments, system 200 (e.g., using CPU 209, WLAN subsystem 205, and/or memory 211) is configured to track the time and/or power consumed by, for example, WLAN subsystem 205 during the LPAS mode during a predetermined time period. For example, system 200 determines and tracks a metric as the consumed time and/or power by WLAN subsystem 205 during LPAS mode. The determined metric indicates how much time and/or power WLAN subsystem 205 has consumed for associating with AP 110 and/or for the operation(s) performed to maintain the connection with AP 110. System 200 compares the determined metric with the power budget to determine whether WLAN subsystem 205 has consumed its power budget before the predetermined time period is expired.

If the determined metric is less than or equal to the power budget, WLAN subsystem 205 can maintain the LPAS mode. Alternatively, if the determined metric is greater than the power budget, then the LPAS mode is disabled, according to some embodiments. Additionally, the connection to AP 110 can be severed and/or WLAN subsystem 205 can be disabled. In some embodiments, in addition to the power budget of the LPAS mode, system 200 can monitor the power available to system 200 in determining whether to maintain the LPAS mode. For example, system 200 can compare its available power (provided by, for example, a battery (not shown)) to a threshold (for example, but not limited to, 20% of full power, 15% of full power, 10% of full power, 5% of full power, etc.) If system 200's available power is less than the threshold, system 200 may disable the LPAS mode even though the determined metric is still less than or equal to the power budget, according to some embodiments. In other words, the electronic device may disable the LPAS mode to further save power.

According to some embodiments, system 200 (e.g., using CPU 209, WLAN subsystem 205, and/or memory 211) is configured to monitor the quality of the connection to AP 110 (e.g., WLAN link quality) during the LPAS mode and/or during normal operation of WLAN subsystem 205. The quality of the connection can be measured using RSSI (Received Signal Strength Indicator), Signal to Noise Ratio (SNR), Channel Utilization, and the like. If the quality of the connection drops below a threshold, WLAN subsystem 205 can sever the connection to AP 110. If the quality of the connection drops below the threshold during normal operation of WLAN subsystem 205 (e.g., when the LPAS mode is suspended or disabled, WLAN subsystem 205 is configured as the primary networking subsystem, and/or an application is communicating with AP 110 using WLAN subsystem 205), the configuration of WLAN subsystem 205 can be changed to non-primary networking subsystem.

Figure 3:
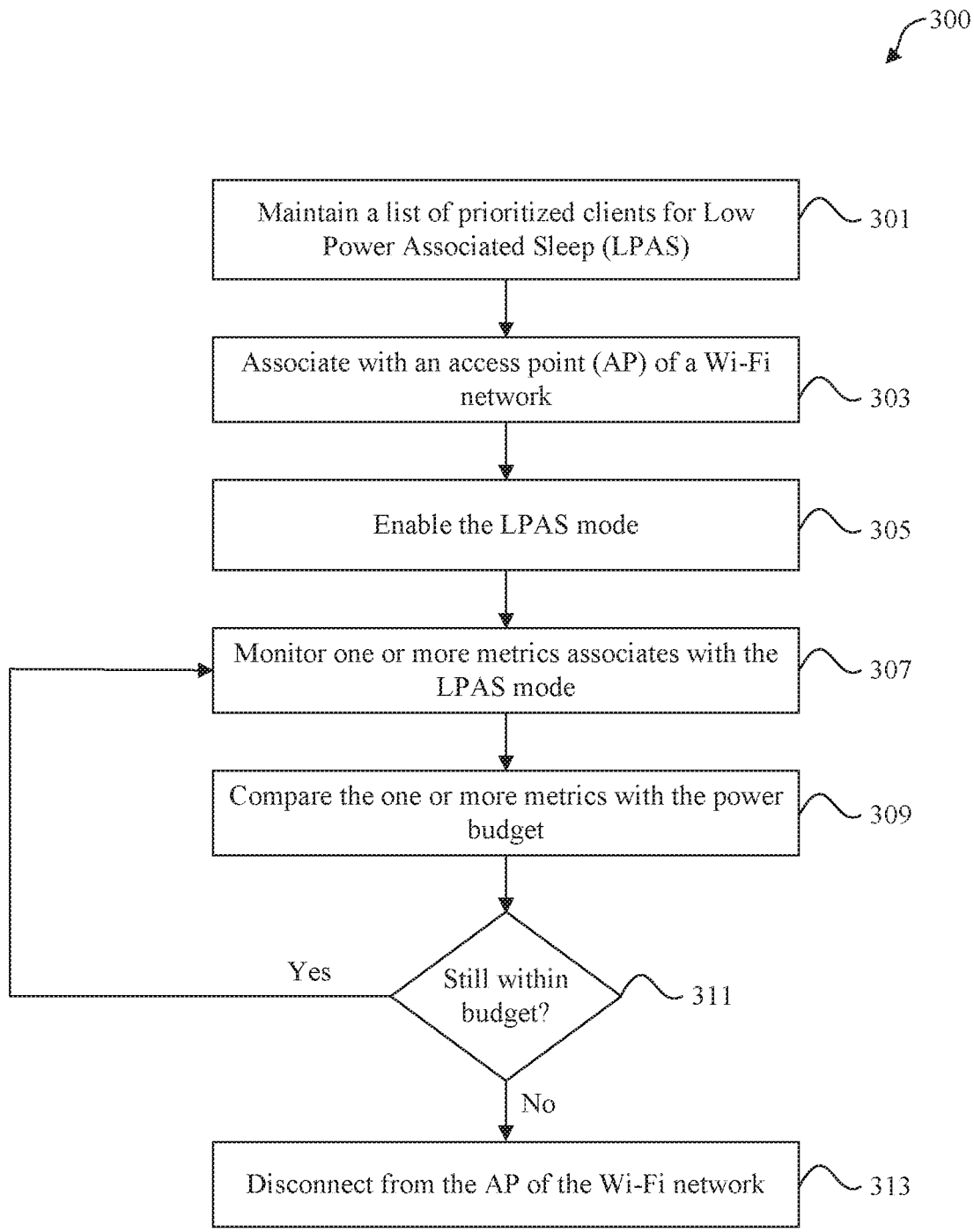
FIG. 3 illustrates an example method for enabling and operating the LPAS mode at an electronic device, according to some embodiments of the disclosure.

FIG. 3 illustrates an example method 300 for enabling and operating a low-power associated sleep (LPAS) mode at an electronic device, according to some embodiments of the disclosure. As a convenience and not a limitation, FIG. 3 is described with respect to FIGS. 1 and 2. However, method 300 is not limited to the specific embodiments depicted in those figures and other systems may be used to perform the method as will be understood by those skilled in the arts. It is to be appreciated not all operations may be needed, and the operations may not be performed in the same order as shown in FIG. 3.

At 301, an electronic device, such as electronic device 150 of FIG. 1, maintains (or has access to) a list of prioritized applications. For example, electronic device 150 can maintain this list in memory 211 of FIG. 2. As discussed above, the list of prioritized applications includes one or more applications that have low latency, high throughput, high bandwidth, fast response time, or similar requirement(s), according to some embodiments. For example, the prioritized applications can include user applications such as, but not limited to, Siri™, radio streaming, video streaming, remote control, and the like. Additionally, the applications on the list of prioritized applications can have access to the LPAS mode of electronic device 150. For example, the applications on the list of prioritized applications can receive an indication from, for example, CPU 209 and/or WLAN subsystem 205 when electronic device 150 establishes a connection with, for example, AP 110 and enters the LPAS mode. In this case, when the applications on the list of prioritized applications want to send and/or receive data using WLAN subsystem 205, these applications can send a request to, for example, WLAN subsystem 205 to suspend the LPAS mode and enable the applications' communication through WLAN subsystem 205.

At 303, electronic device 150 associates with an access point (e.g., AP 110) using, for example, WLAN subsystem 205. As discussed above, AP 110 can be associated with a WLAN and electronic device 150 can associate with AP 110 using information about the WLAN that electronic device 150 receives from, for example, companion electronic device 120a.

At 305, electronic device 150 can enable the LPAS mode when no application is actively using WLAN subsystem 205 (e.g., a WLAN interface) of electronic device 150. Alternatively, the LPAS mode is enabled at preset time instances (e.g., 12 am) and the predetermined time period of the LPAS mode is calculated from these preset time instances. In the LPAS mode WLAN subsystem 205 can operate in low power mode. During the LPAS mode, electronic device 150 maintains connectivity with AP 110 (that was established in 301) without using WLAN subsystem 205 for data exchange.

At 307, electronic device 150 monitors one or more metrics associated with the LPAS mode. According to some embodiments, the electronic device is configured to determine and track the one or more metrics as the time and/or power consumed by, for example, the WLAN system 205 of electronic device 150 for associating with AP 110 and/or for the operation(s) performed during the LPAS mode to maintain the connection with AP 110 during a predetermined time period. As discussed above, although WLAN system 205 of electronic device 150 operates at low power during the LPAS mode, WLAN system 205 still consumes some power during the LPAS mode. WLAN system 205 and/or electronic device 150 associates with AP 110 and/or performs operation(s) during the LPAS mode to maintain the connection with AP 110. The operation(s) performed by WLAN system 205 of electronic device 150 consumes power, although less power than is consumed when the WLAN system 205 is associated with AP 110 and is not in LPAS mode.

At 309, electronic device 150 compares the calculated/monitored one or more metrics with the power budget to determine whether WLAN subsystem 201 of electronic device 150 has consumed its power budget before the predetermined time period is expired. According to some embodiments, electronic device 150 is configured to calculate the one or more metrics and compare the one or more metrics with the power budget periodically based on a preset time period. Additionally or alternatively, electronic device 150 can calculate the one or more metrics and compare the one or more metrics with the power budget based on one or more triggers. In some examples, a trigger can include the start and/or the stop of an operation that WLAN subsystem 205 of electronic device 150 performs during the LPAS mode to maintain the connectivity to AP 110. For example, before WLAN subsystem 205 performs an operation(s) to maintain the connectivity to AP 110, electronic device 150 calculates the one or more metrics and compares the one or more metrics with the power budget. Or, after WLAN subsystem 205 performs the operation(s) to maintain the connectivity to AP 110, electronic device 150 calculates the one or more metrics and compares the one or more metrics with the power budget.

At 311, electronic device 150 determines whether the calculated one or more metrics are still within the power budget. According to some embodiments, if the calculated one or more metrics are less than or equal to the power budget, WLAN subsystem 205 of electronic device 105 maintains the LPAS mode and method 300 continues at 307. According to some embodiments, if the calculated one or more metrics are less than or equal to the power budget but the difference between the power budget and the one or more metrics is less than a threshold (e.g., the remaining budget is less than the threshold), an alert can be generated by, for example, CPU 209 and method 300 continues at 307.

If the calculated one or more metrics are greater than the power budget, then method 300 continues at 313. At 313, the LPAS mode of WLAN subsystem 205 of electronic device 150 is disabled, the connection to AP 110 is severed, and/or WLAN subsystem 205 is disabled (or is set to non-primary interface), according to some embodiments.

In some embodiments, at operations 307 and 309, in addition to the power budget associated to the LPAS mode, electronic device 150 can monitor the power available to electronic device 150 in determining whether to maintain the LPAS mode. For example, electronic device 150 can compare its available power to a threshold. If electronic device 105's available power is less than the threshold, electronic device 105 may disable the LPAS mode (sever connection to AP 110, disable WLAN subsystem 205, and/or set WLAN subsystem 205 to non-primary interface) even though the calculated one or more metrics are still less than or equal to the power budget, according to some embodiments.

Figure 4:
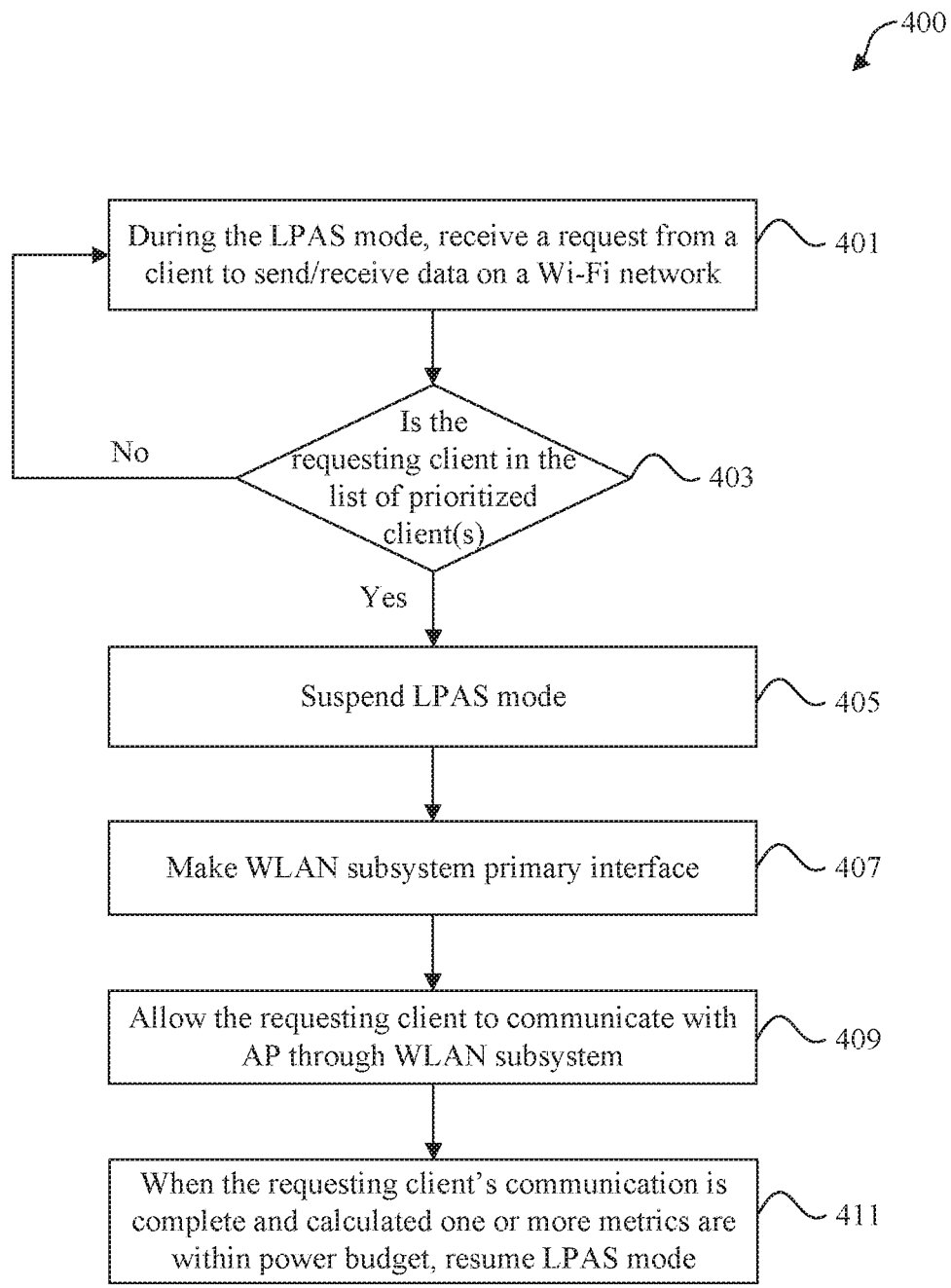
FIG. 4 illustrates an example method for operating the LPAS mode at an electronic device, according to some embodiment of the disclosure.

FIG. 4 illustrates an example method 400 for operating a low-power associated sleep (LPAS) mode at an electronic device, according to some embodiment of the disclosure. As a convenience and not a limitation, FIG. 4 is described with respect to FIGS. 1-3. But method 400 is not limited to the specific embodiments depicted in those figures and other systems may be used to perform the method as will be understood by those skilled in the arts. It is to be appreciated that not all operations may be needed, and the operations may not be performed in the same order as shown in FIG. 4.

Additionally, method 400 can be performed in conjunction with method 300 of FIG. 3. For example, method 400 can be performed after operations 301-305 of method 300 and in conjunction with operations 307-313 of method 300.

Method 400 is performed during the LPAS mode of electronic device 150 (e.g., after the LPAS mode of WLAN subsystem 205 of electronic device 150 is enabled), according to some embodiments. At 401, a request from an application to send and/or receive data on a WLAN is received within electronic device 150. For example, CPU 209 and/or networking subsystem 201 receives the request from an application, such as application 213. According to some embodiments, the requesting application requests to use WLAN subsystem 205. Additionally or alternatively, the request is for transmitting and/or receiving data and does not indicate any networking interface to be used. In this example, CPU 209 and/or networking subsystem 201 determines, based at least on, for example, one or more of latency, throughput, bandwidth, response time, or similar requirement(s) of the requesting application, an appropriate networking interface for the application. For example, CPU 209 and/or networking subsystem 201 determines which one of cellular subsystem 203, WLAN subsystem 205, or Bluetooth™ subsystem 201 is more appropriate for the requesting application. CPU 209 and/or networking subsystem 201 may determine to use WLAN subsystem 205 for the requesting application.

Optionally at 403, it is determined whether the requesting application is on the list of prioritized applications. For example, CPU 209 and/or networking subsystem 201 can determine if the requesting application is on the list of prioritized applications. According to some embodiments, only applications on the list of prioritized applications are aware of the LPAS mode of electronic device 150. Therefore, in these embodiments the requesting application is on the list of prioritized applications and 403 can be optional. Additionally or alternatively, after receiving the request, CPU 209 and/or networking subsystem 201 can compare an identifier of the requesting application with one or more identifier(s) of one or more applications on the list of prioritized applications to determine whether the requesting application is on the list of prioritized applications. It is noted that other methods can be performed to make the determination of 403.

If the requesting application is not on the list of prioritized applications, method 400 returns to 401. However, if the application is on the list of prioritized applications, method 400 continues to 405. At 405, the LPAS mode is suspended. For example, CPU 209 and/or networking subsystem 201 suspends the LPAS mode for WLAN subsystem 205. According to some embodiments, before suspending the LPAS mode, a metric associated with the LPAS mode of the WLAN subsystem 205 is compared to the power budget (for example as discussed with respect to 307-311 of FIG. 3). In response to determining that the metric is less than or equal to the power budget (and the application is on the list of prioritized applications), the LPAS mode for WLAN subsystem 205 is suspended.

At 407, WLAN subsystem 205 is configured (e.g., established) as the primary networking interface. According to some embodiments, during the LPAS mode, WLAN subsystem 205 is configured as a non-primary networking interface. After the LPAS mode is suspended to accommodate the transmission and/or reception for the requesting application, the configuration of WLAN subsystem 205 is changed to primary networking interface.

At 409, the requesting application uses WLAN subsystem 205 to communicate with AP 110 and transmits/receives data from AP 110 through WLAN subsystem 205.

At 411, when the requesting application's communication using WLAN subsystem 205 is complete and the calculated one or more metrics are within the power budget (as discussed with respect to method 300 of FIG. 3), CPU 209 and/or networking subsystem 201 can resume the LPAS mode. However, if the calculated one or more metrics are not within the power budget (or the calculated one or more metrics are within the power budget but electronic device 150's available power is less than a threshold), electronic device 150 may disable the LPAS mode, sever the connection to AP 110, and/or disable WLAN subsystem 205 (or set WLAN subsystem 205 to non-primary interface).

Figure 5:
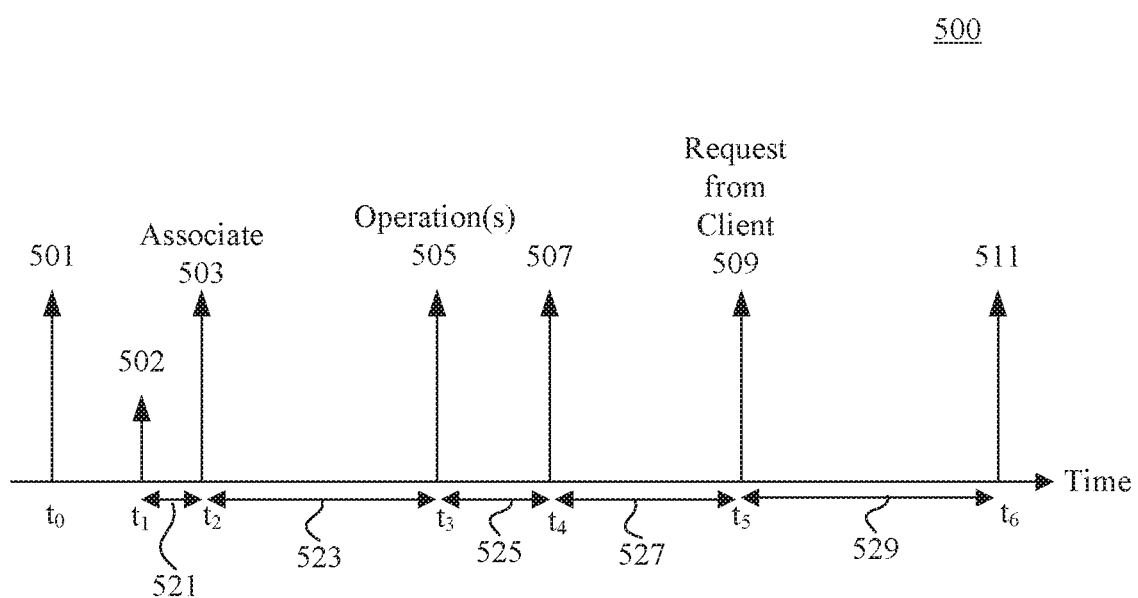
FIG. 5 illustrates one example implementation and associated timings for operating the LPAS mode, according to some embodiments of the disclosure.

FIG. 5 illustrates one example implementation and associated timings for operating in low power associated sleep (LPAS) mode, according to some embodiments of the disclosure. Operation 500 can start at time to when an electronic device (e.g., electronic device 150) boots 501 and the LPAS mode for the electronic device begins/is enabled, according to some embodiments. Additionally or alternatively, time instant to is a preset time instant when the LPAS mode for the electronic device begins/is enabled (e.g., 5 am, midnight, etc.).

At time instant $t_1$, the electronic device begins a process 502 to associate with an access point (e.g., AP 110). For example, the electronic device receives, from a companion electronic device (e.g., companion electronic device 120a), an indication and/or information about the AP. At time instant $t_2$, the electronic device successfully associates 503 with the AP. According to some embodiments, during time period 521 (when the electronic device perform operation(s) to associate with AP 110), the electronic device may operate its WLAN subsystem or one or more transceivers of the WLAN subsystem at normal (or substantially normal) operating power. Alternatively, the one or more WLAN transceivers can be activated (e.g., turned "on") to perform the operation(s) to associate with the AP, but operated at a reduced power level compared to normal operating power, (e.g. outside LPAS mode). According to some examples, the time period 521 between time instants $t_1$ and $t_2$ is considered as time/power consumed for associating with the AP. In other words, period 521 is considered as a metric associated with the LPAS mode, which goes toward the power budget of the electronic device. According to some examples, the electronic device calculates the one or more metrics and compares the one or more metrics with the power budget at time instant $t_2$.

During the time period 523 (between time instants $t_2$ and $t_3$) the electronic device operates its WLAN subsystem or one or more transceivers of the WLAN subsystem at low power mode. At time instant $t_3$, the electronic device initiates operation(s) 505 to maintain the connectivity to the AP. According to some examples, the electronic device calculates/updates the metric and compares the metric with the power budget at time instant $t_3$. In this example, the metric at time instant $t_3$ is still time period 521.

The operation(s) 505 can last for a time period of 525. According to some embodiments, during the time period 525 (when operation(s) 505 are performed to maintain the connectivity with the AP), the electronic device may operate its WLAN subsystem or one or more transceivers of the WLAN subsystem at normal (or substantially normal) operating power. For example, the WLAN subsystem of the electronic device may operate at normal operating power to transmit one or more ARP packets (e.g., gratuitous ARP packets), transmit "Keep-Alive" messages, listen for (or receive) beacon(s), update transceiver clocks and/or frequency, or the like to maintain the connectivity with the AP. Alternatively, the one or more WLAN transceivers can be activated (e.g., turned "on") to perform the connectivity maintenance, but operated at a reduced power level compared to normal operating power, (e.g. outside LPAS mode). The time period 525 is considered as time/power consumed for maintaining connectivity with the AP. In other words, period 525 is considered as a metric associated with the LPAS mode, which goes toward the power budget of the electronic device. According to some examples, the electronic device updates the metric by adding time periods 521 and 525. The electronic device then compares the updated metrics (e.g., time period 521+time period 525) with the power budget at time instant $t_4$.

During the time period 527 (between time instants $t_4$ and $t_5$) the electronic device operates its WLAN subsystem or one or more transceivers of the WLAN subsystem at low power mode. At time instant $t_5$, the electronic device receives a request 509 from an application (e.g., an application in the list of prioritized applications) to send/receive data through the AP and using the connection with AP. According to some examples, the electronic device calculates/updates the metric and compares the metric with the power budget at time instant $t_5$. In this example, the metric at time instant $t_5$ is still time period 521+time period 525.

The electronic device suspends the LPAS mode and allows the application to send/receive data through the AP using the connection with AP. The communication between the application and the AP can last for time period 529. At time instant $t_6$, the electronic device resumes the LPAS mode 511. According to some examples, the electronic device calculates/updates the metric and compares the metric with the power budget at time instant $t_6$. In this example, the metric at time instant $t_6$ is still time period 521+time period 525.

Figure 6:
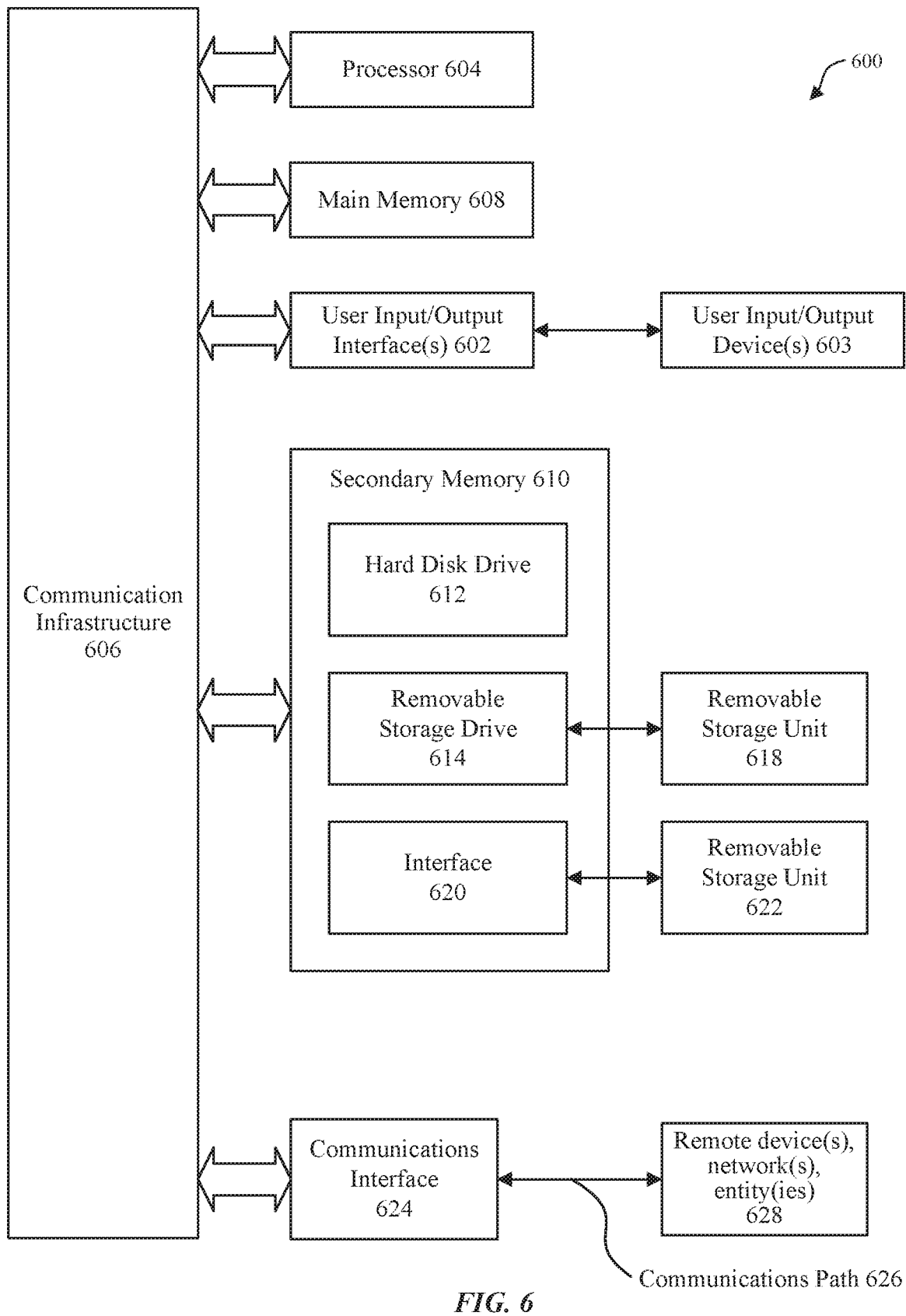
FIG. 6 is an example computer system for implementing some embodiments or portion(s) thereof.

Various embodiments can be implemented, for example, using one or more computer systems, such as computer system 600 shown in FIG. 6. Computer system 600 can be used, for example, to implement method discussed in this disclosure such as, but not limited to, method 300 of FIG. 3 and/or method 400 of FIG. 4. Also, one or more of AP 110, electronic devices 120, electronic device 150, system 200, or part of the devices and systems may be implemented using computer system 600. Computer system 600 can be any computer capable of performing the functions described herein, for example, enabling and/or operating low power mode.

Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 1006 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618.

According to some embodiments, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. An electronic device, comprising:
    a memory that stores program instructions;
    a wireless local area network (WLAN) subsystem configured to communicate over a wireless network;
    a processor, upon executing the program instructions, configured to:
        enable a sleep mode of the WLAN subsystem, wherein the electronic device maintains a connection with an access point of the wireless network during the sleep mode;
        receive, during the sleep mode of the WLAN subsystem, a request from an application to communicate with the wireless network, wherein the application is included in a list of prioritized applications;
        determine that a metric associated with the sleep mode of the WLAN subsystem is less than or equal to a power budget;
        in response to the determining, suspend the sleep mode of the WLAN subsystem; and
        enable the communication between the application and the access point of the wireless network using the WLAN subsystem.

2. The electronic device of claim 1, wherein the processor is further configured to:
    establish the WLAN subsystem as a primary networking interface of the electronic device after the sleep mode of the WLAN subsystem is suspended.

3. The electronic device of claim 1, wherein the processor is further configured to:
    calculate the metric associated with the sleep mode of the WLAN subsystem; and
    compare the metric to the power budget.

4. The electronic device of claim 3, wherein the processor is further configured to:
    determine that the communication between the application and the access point of the wireless network is complete;
    determine that the metric is less than or equal to the power budget; and
    resume the sleep mode of WLAN subsystem.

5. The electronic device of claim 3, wherein the processor is further configured to:
    determine that the communication between the application and the access point of the wireless network is complete;
    determine that the metric is greater than the power budget;
    disable the sleep mode of the WLAN subsystem; and
    sever the connection between the application and the access point of the wireless network.

6. The electronic device of claim 1, wherein the processor is further configured to:
    receive, from a companion electronic device, information corresponding to the wireless network; and
    associate with the access point of the wireless network using the received information.

7. The electronic device of claim 1, wherein the power budget represents, for a time interval, a duration during which operations can be performed to maintain the connection with the access point.

8. The electronic device of claim 1, wherein the processor is further configured to:
    determine that the communication between the application and the access point of the wireless network is complete;
    determine that the metric does not exceed the power budget and that an available power level of the electronic device is below a threshold;
    disable the sleep mode of the WLAN subsystem; and
    sever the connection between the application and the access point of the wireless network.

9. A method, comprising:
    enabling a sleep mode of a wireless local area network (WLAN) subsystem of an electronic device, wherein the electronic device maintains a connection with an access point of a wireless network during the sleep mode;
    receiving from an application, while the WLAN subsystem is in the sleep mode, a request to communicate with the wireless network, wherein the application is included in a list of prioritized applications;
    in response to determining that a metric associated with the sleep mode of the WLAN subsystem does not exceed a predetermined power budget for a time interval, suspending the sleep mode of the WLAN subsystem; and
    enabling, after the suspension of the sleep mode, the communication between the application and the access point of the wireless network using the WLAN subsystem.

10. The method of claim 9, further comprising:
    configuring the WLAN subsystem as a primary networking interface of the electronic device when the sleep mode of the WLAN subsystem is suspended.

11. The method of claim 9, further comprising:
    determining that the communication between the application and the access point of the wireless network is complete;
    determining that the metric does not exceed the power budget; and
    resuming the sleep mode of WLAN subsystem.

12. The method of claim 9, further comprising:
    determining that the communication between the application and the access point of the wireless network is complete;
    determining that the metric exceeds the power budget;
    disabling the sleep mode of the WLAN subsystem; and
    severing the connection between the application and the access point of the wireless network.

13. The method of claim 9, further comprising:
    receiving, from a companion electronic device, information corresponding to the wireless network; and
    associating with the access point of the wireless network using the received information.

14. The method of claim 9, further comprising:
determining that the communication between the application and the access point of the wireless network is complete;
determining that the metric does not exceed the power budget and an available power of the electronic device is less than a threshold;
disabling the sleep mode of the WLAN subsystem responsive to determining that the amount of the available power of the electronic device is less than the threshold; and
severing the connection between the application and the access point of the wireless network.

15. A non-transitory computer-readable medium storing instructions that, when executed by a processor of an electronic device, cause the processor to perform operations comprising:
enabling a low-power associate sleep (LPAS) mode for the electronic device, wherein during the LPAS mode a wireless local area network (WLAN) subsystem of the electronic device is in a lower power mode while the electronic device maintains a connection with an access point of a wireless network;
receiving, during the lower power mode, a request from an application to communicate with the wireless network, wherein the application is included in a list of prioritized applications;
suspending the lower power mode of the WLAN subsystem responsive to determining that a metric associated with the lower power mode has a value less than or equal to a power budget; and
enabling, subsequent to suspending the lower power mode, the communication between the application and the access point of the wireless network using the WLAN subsystem in response to the suspension of the lower power mode.

16. The non-transitory computer-readable medium of claim 15, wherein the operations further comprise:
configuring the WLAN subsystem of the electronic device as a primary networking interface of the electronic device when the lower power mode of the WLAN subsystem is suspended.

17. The non-transitory computer-readable medium of claim 15, wherein the operations further comprise:
calculating the metric associated with the lower power mode of the WLAN subsystem;
comparing the metric to the power budget, wherein the power budget comprises a total time to perform operations maintaining the connection with the access point during a predetermined time interval;
determining that the communication between the application and the access point of the wireless network is complete;
determining that the metric does not exceed the power budget; and
resuming the lower power mode of WLAN subsystem.

18. The non-transitory computer-readable medium of claim 15, wherein the operations further comprise:
determining that the communication between the application and the access point of the wireless network is complete;
determining that the metric exceed the power budget;
disabling the lower power mode of the WLAN subsystem until a subsequent time interval; and
severing the connection between the application and the access point of the wireless network.

19. The non-transitory computer-readable medium of claim 15, wherein the operations further comprise:
receiving, from a companion electronic device, information corresponding to the wireless network; and
associating with the access point of the wireless network using the received information.

20. The non-transitory computer-readable medium of claim 15, wherein the operations further comprise:
determining that the communication between the application and the access point of the wireless network is complete;
determining that the metric does not exceed the power budget;
determining that an amount of available power of the electronic device is less than a threshold;
disabling the lower power mode of the WLAN subsystem; and
severing the connection between the application and the access point of the wireless network.

* * * * *